UNITED STATES PATENT OFFICE.

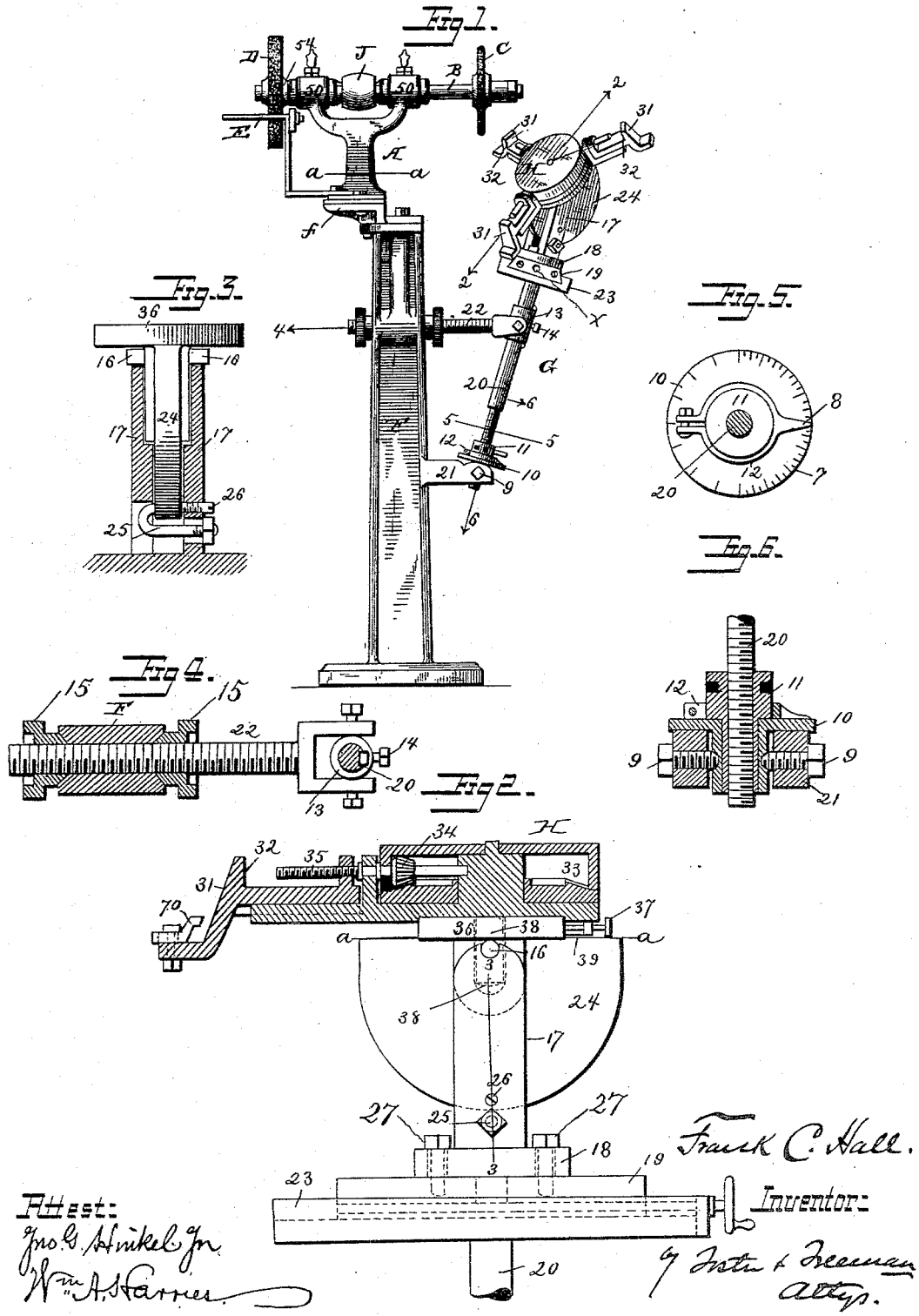

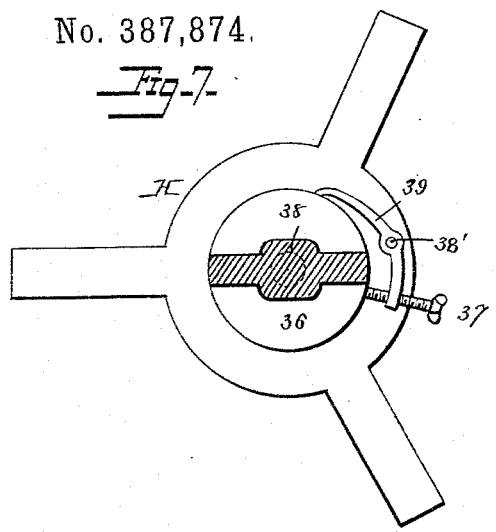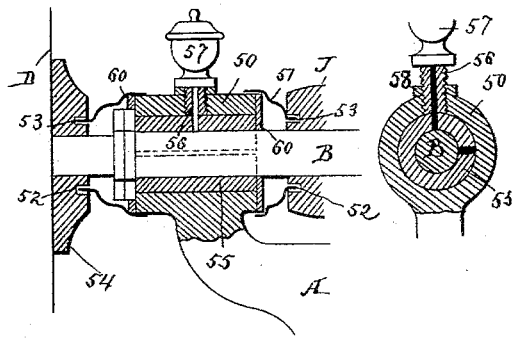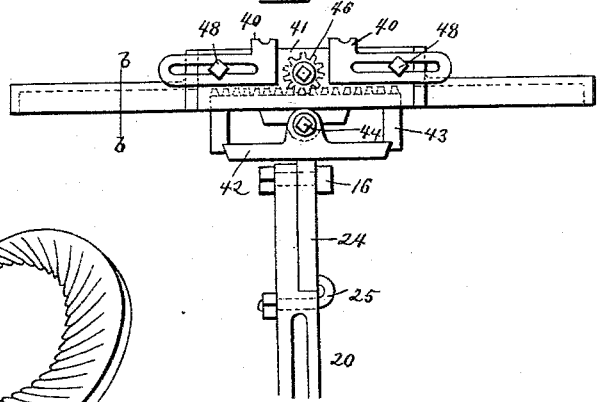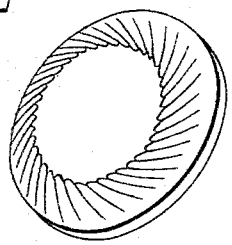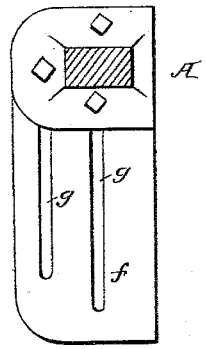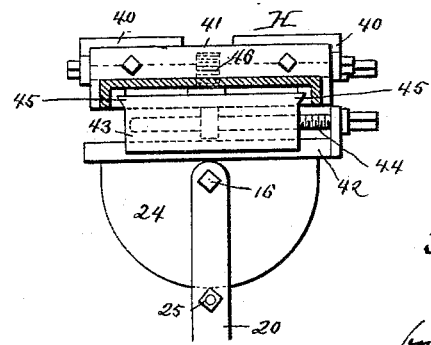

FRANK C. HALL, OF PHILADELPHIA, PENNSYLVANIA.

GRINDING-MACHINE.

SPECIFICATION forming part of Letters Patent No. 387,874, dated August 14, 1888.

Application filed August 26, 1887. Serial No. 247,960. (No model.)

*To all whom it may concern:*

Be it known that I, FRANK C. HALL, a citizen of the United States, residing in the city and county of Philadelphia, and State of Pennsylvania, have invented certain new and useful Improvements in Grinding-Machines, of which the following is a specification.

This invention relates, generally, to devices for supporting and properly presenting work to the action of cutting, abrading, or other tools, whereby the required action of the tool upon the work is effected and controlled.

The invention is illustrated in connection with an emery or other similar wheel to which the work to be operated upon is presented.

The accompanying drawings, illustrating a practical embodiment of the present improvements, represent by Figure 1 an elevation of an emery-grinder provided with the improved work-support; Fig. 2, an enlarged sectional elevation, taken on the line 2 2 of Fig. 1, of a chuck for holding the work and its immediate connections; Fig. 3, an enlarged cross vertical section of the same, taken on the line 3 3 of Fig. 2; Fig. 4, an enlarged horizontal section, taken on the line 4 of Fig. 1, through the emery-grinder standard; Fig. 5, a similar view taken on the line 5 of Fig. 1; Fig. 6, an enlarged vertical section taken on the line 6 of Fig. 1; Fig. 7, a horizontal section taken on the line $a\, a$, Fig. 2, looking in the direction of the arrow; Fig. 8, a perspective view hereinafter referred to; Fig. 9, a horizontal section taken on the line $a\, a$ of Fig. 1, showing the adjustability of the head on its pedestal; Fig. 10, a vertical central section taken through the left-hand bearing of the head; Fig. 11, a front elevation of a modified form of the work-holder; and Fig. 12, a sectional elevation of the same, taken on the line $b\, b$ of Fig. 11.

Referring to said drawings, particularly Fig. 1, it is to be understood that A represents the head of an ordinary emery-grinder. It may, as before stated, be any other head having bearings for the support of a shaft, B. As shown, this shaft supports a cutting or abrading tool, C, consisting of an emery or other similar wheel. The shaft is also shown as supporting another wheel, D, which may be employed for cutting, abrading, or polishing articles presented to it and supported by an ordinary rest, E, as is well understood.

The head A is preferably secured to and supported by a standard or pedestal, F, having a broad base and designed to rest upon the floor, and to which it may be bolted, if desired.

The top of the standard or pedestal F is provided with a table, $f$, Fig. 9, to which the base of the head A is bolted, as shown, the said table having slots $g$, permitting the position of the head thereon to be adjusted as may be desired.

The improved work-support G consists, essentially, of a chuck, H, or other equivalent means for firmly grasping and supporting the article to be operated upon, and a shaft or rod, 20, upon one end of which the chuck is mounted.

In order to capacitate the work-support G to sustain the work or article to be operated upon of any shape and in any desired position with relation to the cutting or abrading tool, and also to present such work or article to the tool in any direction, the said rod 20 and chuck H are supported in such manner as to form a support capable of universal movement and adjustment, now to be particularly set forth.

The rod 20 at or near its lower end is pivotally mounted in a bracket, 21, extending from the side of the pedestal, and at or near its opposite end it is pivotally held at the end of a horizontal arm, 22, that is held in adjustable bearings provided in the pedestal. This rod, the end of which is screw-threaded, is pivotally mounted to the bracket through a sleeve, 23, and which sleeve is engaged by set-bolts 9, provided in the bracket. The upper portion of this sleeve is flanged at 10, providing a seat and stop for a nut, 11, having two external diameters, the smaller one to enter said sleeve and the larger to rest upon the flange 10, which nut engages with the screw-threaded end of the rod 20. The degree to which the nut is turned and the rod elevated or lowered, so as to raise or lower the work to or from the tool, may be noted by securing an index, 8, thereto, preferably through an adjustable split ring, 12, as shown, said index being employed in connection with suitable graduations, 7, provided on the face of the flange 10.

The degree of inclination of the rod 20 and the adjustment of the work to and from the operating-tool is had by the horizontal arm, 22, which is pivotally connected to the rod through a sleeve that may be fixed, if desired, to the rod by a spline and set-screw, 14, to prevent the rod from turning. The arm 22 in passing through the bearing in the pedestal is screw-threaded and provided with conical-ended nuts 15 on either side thereof, so that the position of the arm may be adjusted and held in its adjusted position. Of course when the rod is being elevated or lowered by turning the nut 11 the set-screw 14 will be loosened to permit the rod to pass freely through the sleeve 13, and when it is brought to the desired position said screw may be tightened to fix the rod in its adjusted position.

The chuck is mounted through pivots 16 upon a bifurcated arm or pair of arms, 17, that project from a plate, 18, adjustably mounted, so as to have rotary movement upon a slide, 19, that in turn is held in a head, 23, secured to the top of the rod 20.

The bottom of the chuck is provided with a quadrant-shaped guide-plate, 24, that passes between the arms 17 and serves to guide the chuck as it rocks from one position to another on the pivots 16. It is secured in any position it may be rocked by means of a bolt, 25, the hooked end of which, lying in an opening in one of the arms, bears against the side of the plate 24 and presses it to one side in frictional contact with one of the arms 17. It may, however, be aided in securing the fixed position of the chuck by a set-screw, 26, tapped into the arm and bearing against the opposite face of the plate, as shown in Fig. 3.

The rotary movement of the plate 18 may be had by loosening screws 27, passing through slots in the plate 18, and securing it and slide 19 together in a manner well understood.

From the foregoing it will be seen that provision is made by which the work secured by the chuck may be supported upon a vertically-arranged rod that is pivotally mounted at its end, so as to be capable of adjusting the chuck to and from the operating-tool, by which said rod and the work may be elevated or lowered, by which the chuck and the work may be rocked or inclined to any desired position with respect to the operating-tool, and by which the chuck may be rotated so as to change the relation of its face with that of the tool, and thus a support is provided by which any portion of a complicated or irregular casting or article may be readily presented to the operation of said tool.

In Fig. 8 I have shown a truncated-shaped disk adapted for use in a paint, coffee, or other grinding mill that is provided with a series of spiral grooves or grooves arranged tangentially with the periphery of the disk and gradually vanishing as they approach the periphery, which grooves have been made by me, employing the device herein described.

The feeding movement of the work, so as to make the groove just referred to, or, in other words, to feed the work under the operating-tool, is accomplished by moving the slide 19 back and forth over the head 23. This may be done in any ordinary manner—for instance, by a screw-rod held in a bearing, 29, on the end of the head 23 and entering a tapped hole in the slide, by turning which rod through the handle 30 said slide, and with it the chuck, is moved back or forth under the tool without altering the other adjustments of the rod and chuck. The chuck, which may be of any of the well-known forms, both an outside and inside one, and universal or otherwise, is, as shown, of the universal kind, having jaws 31 for inside clamping and 32 for outside clamping. Each of these jaws is simultaneously moved by rotating a crown-gear, 33, that meshes with bevel-pinions 34, secured to the adjusting screw-rods 35, as is well understood.

In order to enable the chuck to be rotated independent of the plate 18, it is adjustably mounted on a flange, 36, fixed to the quadrant-shaped guide-plate 24. The chuck and guide-plate are held together by means of a friction-pawl, 39, pivoted at 38' to the under side of the chuck, (see Fig. 7,) that is firmly pressed in contact with the flange 36 by a set-screw, 37, by loosening which the chuck may be rotated on its pivot 38, that is seated in said flange.

As before set forth, the chuck may be of any form capacitated to properly grasp the work and present it to the cutting or abrading tool. In Figs. 11 and 12 there are shown clamps 40, adapted to secure a piece of work to be operated upon upon a flat bed or table, 41, that is mounted upon the end of the rod 20. In this instance, instead of locating the feeding-slide 19 below the quadrant-shaped guide 24, the guide is pivotally supported directly to said rod 20 by pivot 16 and securing-bolt 25, as before, and the slide provided above it by the bed or table 41, and instead of the circular flange 36 the top of the guide 24 is provided with a flange, 42, forming a guide for the crosswise adjustment of a slide, 43, moved by an adjusting-screw, 44, supported by said flange 42 and engaging with a nut provided on the slide. This slide 43 in turn is provided with ways 45 to guide and support the table 41, the longitudinal feeding movement of which on the slide 43 being effected by means of a pinion, 46, carried thereby and engaging a rack, 47, formed on the top of the slide 43. A socket or other wrench may be used to engage with the squared ends of the pinion-shaft and of the screw-shaft to adjust the position of the table 41 and slide 43. The work to be operated upon, it may be stated, will be grasped between the inner sides of the clamps 40 or be laid under the same and secured by tightening the bolts 48.

It is of great importance in this class of machines using emery-wheels or buffing-wheels employing emery to so construct the bearings as to prevent the emery-dust from working into them and cutting and destroying the bearing as well as the shaft. To better obviate this working in of the emery grit or dust, I provide each end of the bearing 50 (see Fig. 10) with a metal cap, 51, that is adapted to fit tightly over the end of the bearing, to which it may be secured by pins or screws, and projecting over and surrounding a short portion of the shaft B, as shown, and having short annular flanges 52, extending into a corresponding recess, 53, formed in the driving-pulley J or in a flanged collar, 54, supporting one side of the wheel D, and against which it is clamped in the ordinary manner. With the inclosing-caps 51 washers 60 may be used to press against the ends of the bearing. The bushing 55 in this instance is a split one, as shown, that, as the bearing portion of the shaft and said bushing wears, may be squeezed somewhat to take up said wear by a screw, 56, tapped into the bearing 50 and bearing against the top side of the bushing. This screw may carry the ordinary oil-feed cup, 57, and its pressure upon the bushing be regulated by set-nut 58.

Each of the jaws 31 of the chuck H may be provided with a clip, 70, secured to its projecting flange by a bolt, as shown, passing through a slot in the clip. The clip thus provided may be used in connection with the jaws 31 to better secure the work to the chuck.

What I claim is—

1. The combination, with an operating-tool and its support, of a vertically-arranged rod pivoted at one end to said support and carrying at its free end a chuck, a nut for elevating and lowering said rod, and an adjusting-arm connected to the rod and to the support, substantially as described.

2. The combination of the rod supporting at one end a chuck, a pivoted sleeve surrounding said rod, and a nut bearing against said sleeve and supporting the rod, and an adjusting-arm connected to the rod and to the support, substantially as described.

3. The combination of the rod carrying at one end a chuck, a pivoted sleeve and nut supporting the rod at the opposite end, and a sleeve, 13, and arm supporting said rod near its chuck-carrying end, substantially as described.

4. The combination of the rod pivoted at one end, a chuck, and the slide 19, intermediate between the chuck and the pivoted rod, substantially as described.

5. The herein-described rod, pivoted at its lower end and carrying a chuck at its upper end, and adjusting-supports for varying the height of the rod and its vertical position, substantially as described.

6. The combination, with the rod, its pivoted sleeve, and elevating and lowering nut, of a split ring carrying an index and adjustably secured to said nut, substantially as described.

7. The combination of the rod pivoted at its lower end, a chuck, a rotatable plate, and horizontal slide intermediate between the chuck and the end of the rod, substantially as described.

8. The combination, with the chuck and its supporting-flange 36, of the adjustable friction-pawl 39, substantially as described.

9. The combination, with the chuck, its guide-plate, and pivots 16, of the arm 17 and screw-clamps for securing the guide-plate to the arm, substantially as described.

10. The combination, with the bearing 50 and shaft B, of caps 51, supported by the bearing and surrounding the shaft and having annular flanges, as 52, as and for the purpose specified.

11. The combination, with the bearing 50 and shaft B, of the split bushing 55, oil-cup, and set-screw 56, bearing upon said bushing, substantially as described.

In testimony whereof I have signed my name to this specification in the presence of two subscribing witnesses.

FRANK C. HALL.

Witnesses:
J. S. BARKER,
GEO. H. GRAHAM.